Figure 1:
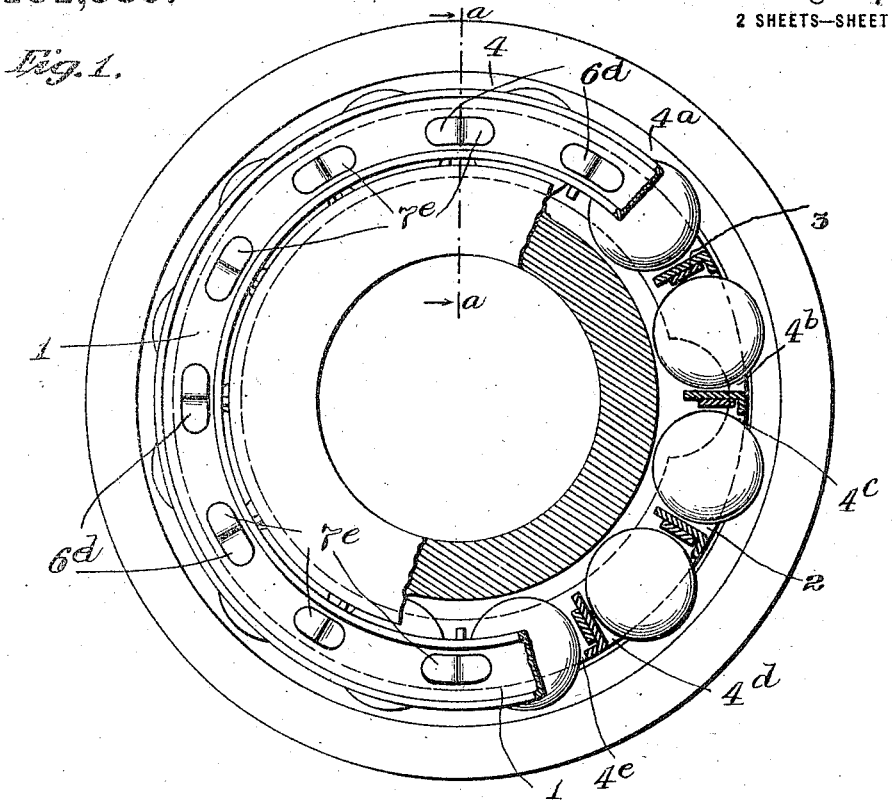

H. HESS.
CAGE FOR ANTIFRICTION BEARINGS.
APPLICATION FILED DEC. 10, 1912.

1,151,589.

Patented Aug. 31, 1915.
2 SHEETS—SHEET 1.

Witnesses:

Inventor
Henry Hess
By his Attorneys
Rogers, Kennedy & Campbell

H. HESS.
CAGE FOR ANTIFRICTION BEARINGS.
APPLICATION FILED DEC. 10, 1912.
1,151,589.
Patented Aug. 31, 1915.
2 SHEETS—SHEET 2.
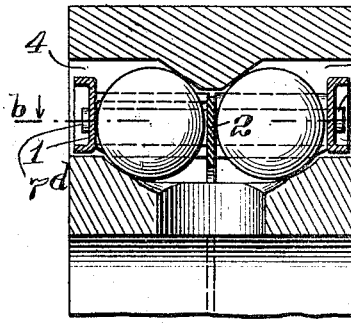
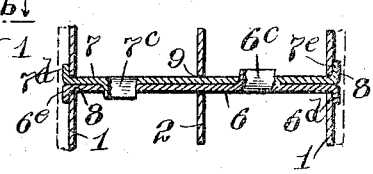
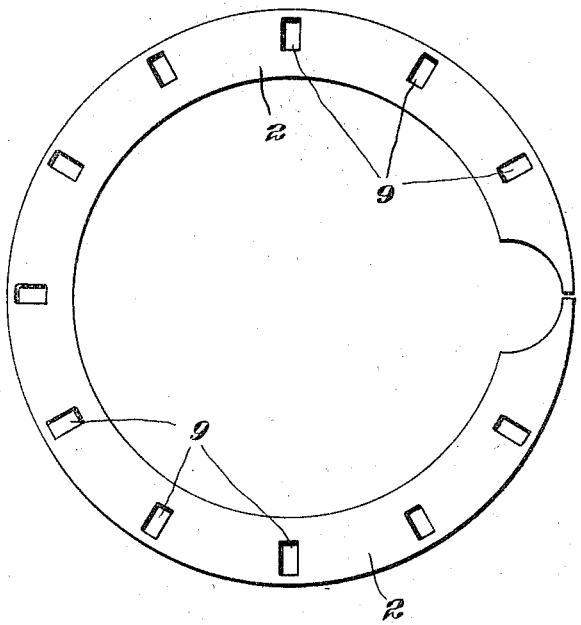
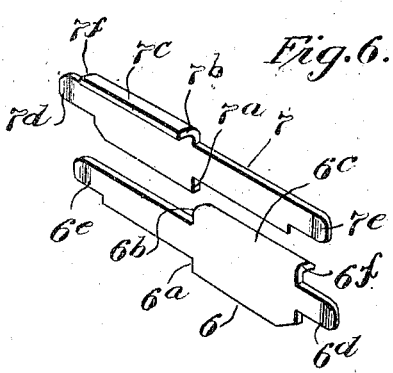
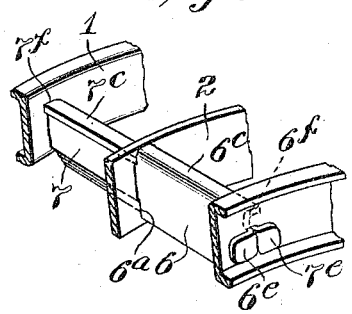
Inventor
Henry Hess
By his Attorneys
Rogers, Kennedy & Campbell
Witnesses:

UNITED STATES PATENT OFFICE.

HENRY HESS, OF PHILADELPHIA, PENNSYLVANIA, ASSIGNOR TO HESS-BRIGHT MANUFACTURING COMPANY, A CORPORATION OF DELAWARE.

CAGE FOR ANTIFRICTION-BEARINGS.

1,151,589.  Specification of Letters Patent.  Patented Aug. 31, 1915.

Application filed December 10, 1912. Serial No. 735,985.

*To all whom it may concern:*

Be it known that I, HENRY HESS, a citizen of the United States, residing at Philadelphia, in the county of Philadelphia and State of Pennsylvania, have invented certain new and useful Improvements in Cages for Antifriction-Bearings, of which the following is a specification, reference being had therein to the accompanying drawing.

This invention relates to antifriction bearings, and has reference more particularly to the spacing cage which is usually employed in such bearings to maintain the rolling elements in spaced relations.

In certain types of antifriction bearings now known in the trade as "double row" bearings, two series of rolling elements are employed between inner and outer casing members provided respectively with tracks on which the rolling elements travel, and it is to cages for use in bearings of this type that my invention is particularly applicable.

A cage for double row bearings should be of a construction which will not only effect a separation of the individual rolling elements of the respective series from each other, but will also effect the separation of the two series of rolling elements from each other, and while possessing the necessary strength to properly guide the rolling elements, the cage should at the same time possess a certain degree of flexibility in the direction of the travel of the rolling elements, so as not to offer obstruction to the free travel of the same.

In accordance with my invention I have produced a cage fulfilling these requirements, which comprises outer rings, an intermediate ring, and a series of connecting members connected with the outer rings and having shoulders which engage and give support to the intermediate ring. As a result of this construction, there are produced in the cage, two series of ball pockets or sockets, the individual pockets of the respective series being separated from each other by the connecting members, and the two series of pockets being separated from each other by the intermediate ring.

In the accompanying drawings I have shown my improved cage applied to a ball bearing in which the inner casing member is provided with a filling opening extending therethrough between the two ball tracks thereon, the opposite sides of said filling opening terminating respectively inside of the respective ball tracks, so as not to interrupt the continuity of the tracks; and the introduction of the balls into the raceways between the casing members being effected by a slight forcing of the same over the surface between the side of the filling opening and the ball tracks. In constructions of this character it sometimes happens that a ball will escape from its raceway and lodge in the filling opening. This objectionable action will be prevented by the intermediate ring of my improved cage, which ring is of such form and is so located that when the cage is in operative position in the bearing, the ring will extend across the filling opening and in this manner will form a guard against the accidental passage of a ball into the opening.

While my improved cage thus possesses a special advantage in connection with a bearing of the particular type above described, it will be manifest that the invention is not limited to such use, but is applicable to bearings of other detailed form; and it will be understood that my invention is not limited to any particular form or construction of the parts except in so far as such limitations are specified in the claims.

Figure 2:
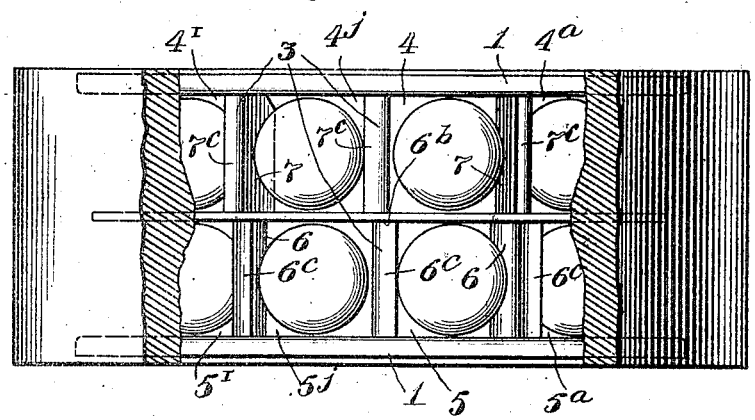

In the accompanying drawings: Figure 1 is a plan view of a ball bearing equipped with my improved cage, parts of the bearing and cage being broken away to expose other parts to view. Fig. 2 is an elevation, with the outer casing member of the bearing broken away to expose the cage and balls therein. Fig. 3 is a sectional elevation on the line *a—a* of Fig. 1. Fig. 4 is a section on the line *b—b* of Fig. 3. Fig. 5 is a perspective view of portions of the outer and intermediate rings of the cage, and one of the connecting members. Fig. 6 is a perspective view of the two plates composing a connecting member. Fig. 7 is an elevation of the intermediate ring of the cage. Fig. 8 is a perspective view of a portion of one of the outer rings.

Referring to the drawings, my improved cage comprises two outer rings 1—1, preferably channeled in their outer faces; an intermediate ring 2; and a series of transverse connecting members 3; whereby two series of ball pockets 4, 4ᵃ, etc., 5, 5ᵃ, etc., are formed respectively on opposite sides of the intermediate ring and between the connecting members.

Each of the connecting members consists of two plates 6 and 7, as shown more particularly in Fig. 6, which plates are reduced at one end for substantially half their length, leaving on plate 6, shoulders $6^a$ and $6^b$, and leaving on plate 7, shoulders $7^a$ and $7^b$, at the junction of the reduced portions of the plates with their widened portions. The widened portion of plate 6 is provided with a strengthening flange $6^c$ extending laterally from the edge of the same, and the widened portion of the other plate 7 is likewise provided with a strengthening flange $7^c$, projecting laterally from its edge, while at their opposite ends the plates are provided with lips, a lip $6^d$ on the wide end of plate 6, a lip $6^e$ on its reduced end, a lip $7^d$ on the wide end of plate 7, and a lip $7^e$ on the reduced end of said plate, shoulders $6^f$ and $7^f$ being thus formed on the respective plates where the lips adjoin the widened portions of the plates. The plates thus formed are counterparts of each other and constitute conjointly a connecting member for maintaining the three rings fixedly in spaced relations, as shown. To adapt the rings of the cage to be connected by these members, the outer rings are provided at intervals with holes 8—8, etc., adapted to receive the lips on the ends of the plates; while the intermediate ring is provided at corresponding intervals with holes 9—9, etc., to receive the reduced portions of the plates, the latter extending face to face with the reduced portion of one plate opposite the widened portion of the other plate, and with the lips on the ends of the plates bent back against the outer faces of the outer rings in the channels thereof. In this position of the parts the shoulders $6^a$ and $6^b$ and the shoulders $7^a$ and $7^b$ on the respective plates will bear respectively on opposite sides of the intermediate ring, and will thereby fixedly and rigidly support the same in its proper spaced relation midway between and parallel with the outer rings.

In the assemblage of the parts of the cage in connection with a bearing of the type illustrated, the intermediate ring is first slipped over the inner casing member of the bearing, the ring being split as at A, to permit this to be bent, and after the two series of balls have been assembled in their respective raceways, the plates of a connecting member are passed at their reduced ends in opposite directions through the openings in the intermediate ring, so that these plates will extend flatly side by side with their shoulders $6^a$, $6^b$ and $7^a$, $7^b$, engaging respectively the opposite sides of the ring, the lateral flange of one plate overlying the edge of the reduced portion of the other plate, and the lips $6^d$ and $7^e$ at one end of the plate abutting flatly against each other, with the lips $6^e$ and $7^d$ at the opposite ends of the plates likewise abutting against each other. After all of the connecting members have been thus applied to the intermediate ring, the two outer rings are inserted in the bearing from opposite sides, and the openings in the rings passed over the abutting lips on the opposite ends of the plates of the connecting members; and after the rings have been forced tightly toward each other to firmly seat the engaging parts, the end lips are spread apart and bent back on the outer sides of the outer rings in the channels thereof, with the result that the rings will be fixedly and firmly connected together in spaced relations. When thus assembled, the outer rings will have a bearing at their inner sides against the respective shoulders $6^f$ and $7^f$, while the intermediate ring will have a bearing at its opposite sides against the shoulders $7^a$ and $7^b$, and $6^a$ and $6^b$ at the junction of the reduced and widened portions of the plates. As a result of this construction, the cage as a whole will possess great stiffness and rigidity in the direction of its axis, while in the direction of the travel of the balls in the bearing, the cage will possess a certain degree of flexibility.

The intermediate ring may be continuous throughout, instead of split, as shown, a split ring being desirable only in the event of the cage being employed in connection with a bearing of the particular type illustrated.

It will be understood, therefore, that my invention is not limited in this connection to the employment of a split ring, but is intended to cover, as well, a ring circumferentially continuous.

Having thus described my invention, what I claim is:

1. A cage for anti-friction bearings, said cage comprising outer rings, an intermediate ring, and connecting members connected with the outer rings said connecting members being provided with shoulders engaging the intermediate ring respectively on opposite sides and serving to maintain said rings in proper spaced relations.

2. A cage for anti-friction bearings, said cage comprising outer rings, an intermediate ring, and connecting members consisting each of two plates connected with the outer rings and provided with shoulders engaging the intermediate ring respectively on opposite sides.

3. A cage for anti-friction bearings, said cage comprising outer rings, an intermediate ring, and a series of connecting members consisting each of two plates reduced at one end to form a shoulder on each plate, said plates being connected with the outer rings and extending face to face through the intermediate ring, with the shoulders bearing respectively on opposite sides of the intermediate ring.

4. In combination with inner and outer casing members, one of said casing members being provided with a filling opening extending therethrough, a cage between the casing members and comprising outer rings and an intermediate ring, and having a series of ball pockets on each side of said latter ring, and two series of balls in said pockets, the said cage being so disposed relative to the casing members of the bearing that the intermediate ring will extend across said filling opening.

In testimony whereof I affix my signature in presence of two witnesses.

HENRY HESS.

Witnesses:
FRANCES TRACY,
C. S. BUTLER.

Copies of this patent may be obtained for five cents each, by addressing the "Commissioner of Patents, Washington, D. C."